(12) United States Patent
Sugiyama et al.

(10) Patent No.: US 9,896,383 B2
(45) Date of Patent: *Feb. 20, 2018

(54) HIGH ZIRCONIA ELECTRICALLY FUSED CAST REFRACTORY

(71) Applicant: Saint-Gobain TM K.K., Tokyo (JP)

(72) Inventors: Hiroshi Sugiyama, Tokyo (JP); Toshimitsu Kuboki, Tokyo (JP); Itaru Hashimoto, Tokyo (JP); Yasuo Misu, Tokyo (JP)

(73) Assignee: Saint-Gobain TM K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/307,873

(22) PCT Filed: Nov. 26, 2014

(86) PCT No.: PCT/JP2014/081918
§ 371 (c)(1),
(2) Date: Oct. 31, 2016

(87) PCT Pub. No.: WO2016/056146
PCT Pub. Date: Apr. 14, 2016

(65) Prior Publication Data
US 2017/0088470 A1    Mar. 30, 2017

(30) Foreign Application Priority Data
Oct. 7, 2014    (JP) .................. 2014-206453

(51) Int. Cl.
*C04B 35/484*    (2006.01)
*C04B 35/49*    (2006.01)
*C03B 5/43*    (2006.01)

(52) U.S. Cl.
CPC .............. *C04B 35/49* (2013.01); *C03B 5/43* (2013.01); *C04B 35/484* (2013.01);
(Continued)

(58) Field of Classification Search
CPC .................................... C04B 35/484
See application file for complete search history.

(56) References Cited

U.S. PATENT DOCUMENTS 5,679,612 A    10/1997  Endo et al.
9,242,903 B2 *  1/2016  Tomura ............... C04B 35/657
(Continued)

FOREIGN PATENT DOCUMENTS

JP    H0848573 A    2/1996
JP    H092870 A     1/1997
(Continued)

OTHER PUBLICATIONS

International Search Report issued in corresponding application No. PCT/JP2014/081918 dated Feb. 17, 2015 (1 page).
(Continued)

*Primary Examiner* — Karl Group
(74) *Attorney, Agent, or Firm* — Osha Liang LLP

(57) ABSTRACT

A high zirconia electrically fused cast refractory having long time durability with less cracking during production and in the course of temperature rising, excellent in productivity, less forming zircon crystals in the refractory itself and even in contact with molten glass, excellent in bubble foamability to molten glass, less generating cracks even undergoing heat cycles during operation of a glass melting furnace. A high zirconia electrically fused cast refractory comprises, as chemical component, 85 to 95% by weight of $ZrO_2$, 0.4 to 2.5% by weight of $Al_2O_3$, 3.5 to 10.0% by weight of $SiO_2$, 0.05% by weight or more of $Na_2O$, 0.05 to 0.7% by weight of $Na_2O$ and $K_2O$ in total, 0.01 to 0.04% by weight of $B_2O_3$, 0.1 to 3.0% by weight of SrO or BaO when one of BaO and SrO is contained, 0.1% by weight or more of SrO and 0.1 to 3.0% by weight of SrO and BaO in total when both of BaO and SrO are contained, 0.01 to 0.2% by weight of CaO, 0.1% by weight or less of MgO, 0.01 to 0.7% by weight of $SnO_2$,
(Continued)

0.3% by weight or less of $Fe_2O_3$ and $TiO_2$ in total, less than 0.01% by weight of $P_2O_5$, and less than 0.01% by weight of CuO.

9 Claims, 1 Drawing Sheet

(52) U.S. Cl.
CPC .......... *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3225* (2013.01); *C04B 2235/3232* (2013.01); *C04B 2235/3244* (2013.01); *C04B 2235/3272* (2013.01); *C04B 2235/3281* (2013.01); *C04B 2235/3293* (2013.01); *C04B 2235/34* (2013.01); *C04B 2235/3409* (2013.01); *C04B 2235/3418* (2013.01); *C04B 2235/6565* (2013.01); *C04B 2235/667* (2013.01); *C04B 2235/72* (2013.01); *C04B 2235/727* (2013.01); *C04B 2235/9669* (2013.01)

(56) References Cited

U.S. PATENT DOCUMENTS 9,475,735 B2 * 10/2016 Kuboki .................... C03B 5/43

| | | |
|---|---|---|
| 2009/0176642 A1 | 7/2009 | Tomura et al. |
| 2013/0210606 A1 | 8/2013 | Tomura |
| 2013/0210607 A1 | 8/2013 | Tomura et al. |
| 2016/0023955 A1 * | 1/2016 | Kuboki ............ C03B 5/43 501/104 |
| 2016/0362342 A1 * | 12/2016 | Sugiyama ......... C03B 5/43 |

FOREIGN PATENT DOCUMENTS

| | | |
|---|---|---|
| JP | 2000-302560 A | 10/2000 |
| JP | 2000302560 A | 10/2000 |
| JP | 2007-176736 A | 7/2007 |
| JP | 2008-007358 A | 1/2008 |
| JP | 2008007358 A | 1/2008 |
| TW | 200724517 A | 7/2007 |
| TW | 200940476 A | 10/2009 |
| TW | 201223913 A | 6/2012 |
| WO | 2012/046785 A1 | 4/2012 |
| WO | 2012/046786 A1 | 4/2012 |
| WO | 2015025901 A1 | 2/2015 |

OTHER PUBLICATIONS

Written Opinion of the International Searching Authority issued in corresponding application No. PCT/JP2014/081918 dated Feb. 17, 2015 (3 pages).

* cited by examiner

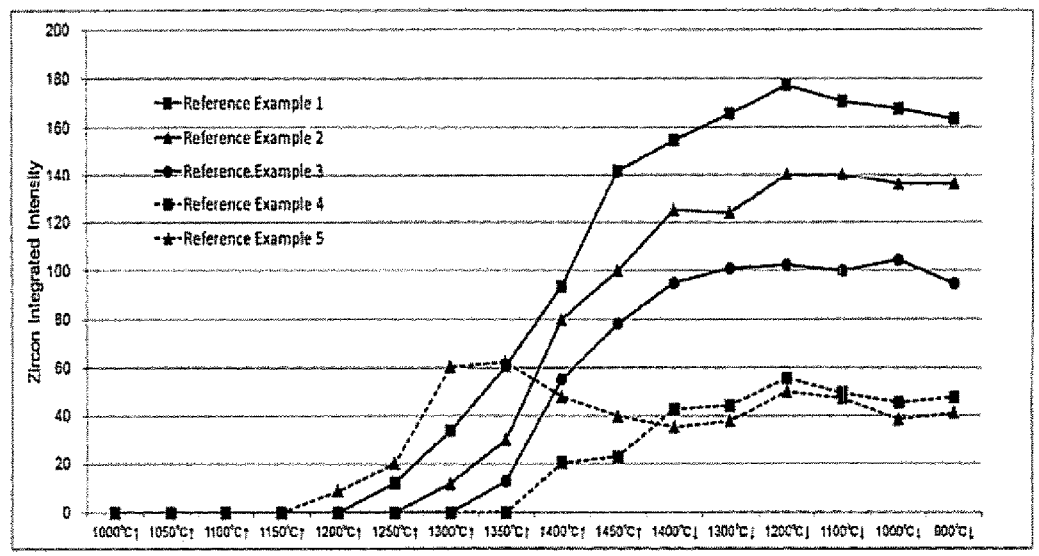

HIGH ZIRCONIA ELECTRICALLY FUSED CAST REFRACTORY

BACKGROUND OF THE INVENTION

Field of the Invention

The present invention relates to a high zirconia electrically fused cast refractory which is excellent in heat cycle stability and bubble formability, less forms zircon crystals when used for glass melting furnaces, and can be used stably for a long time.

Statement of the Related Art

Electrically fused cast refractories (sometimes simply referred to also as refractories) have been used frequently as refractories for use in glass melting furnaces.

The electrically fused cast refractory is a refractory having high density and excellent corrosion resistance to molten glass, produced by melting a raw material formed by mixing main components such as alumina, silica, and zirconia and minor components such as sodium compounds and boric acid each by a predetermined amount in an electric furnace, casting the melts in a refractory mold, and cooling the cast product in an annealing material to solidify the same in the shape of the mold.

For example, a high zirconia electrically fused cast refractory containing 80% by weight or more of $ZrO_2$ is used as the electrically fused cast refractory described above.

Since the high zirconia electrically fused cast refractory has a high $ZrO_2$ content and a dense texture, the refractory has high corrosion resistance to all kinds of molten glass.

Further, since the high zirconia electrically fused cast refractory has a property of not forming a reaction layer at a boundary with the molten glass, it is excellent in that defects such as stones or cords are less formed in the molten glass.

Accordingly, the high zirconia electrically fused cast refractory is particularly suitable to production of high quality glass.

In the mineral structure of the high zirconia electrically fused cast refractory, a most portion thereof comprises monoclinic zirconia crystals in which a small amount of a glass phase fills the grain boundaries of the zirconia crystals.

However, the property of the high zirconia electrically fused cast refractory undergoes a significant effect depending on the kind and the amount of components that constitute the glass phase.

Generally, the glass phase of the high zirconia electrically fused cast refractory comprises oxides such as $Al_2O_3$, $SiO_2$, $Na_2O$, $B_2O_3$, and $P_2O_5$.

On the other hand, zirconia crystals of the refractory transform reversibly between a monoclinic system and a tetragonal system accompanying abrupt volumic change about at a temperature of 1000° C. (in the course of temperature lowering) to 1150° C. (in the course of temperature rising).

A high zirconia electrically fused cast refractory with no cracks (fracture) during production and in the course of temperature rising can be produced at a level of actual production by moderating a stress generated by the volumic change accompanying the transformation of the zirconia crystals by the flow of a glass phase that fills crystal grain boundaries.

In glass melting furnaces using the high zirconia electrically fused cast refractory, burners are often used as a heat source. In a burner combustion type melting furnace, burners are changed on every several ten minutes and the temperature at the surface of the electrically fused cast refractory rises and lowers on every change.

Accordingly, the high zirconia electrically fused cast refractory which is often used for several years undergoes a number of heat cycles.

When the high zirconia electrically fused cast refractory undergoes the heat cycles, silica ($SiO_2$) as main components of the glass phase and zirconia ($ZrO_2$) crystals sometimes react to form zircon ($ZrO_2 \cdot SiO_2$) crystals.

In this case, since the zircon crystals are formed in the glass phase, formation of the zircon crystals leads to relative decrease of the glass phase. Further, as the glass phase decreases due to growing or increase of the zircon crystals, abrupt volumic change of the zirconia crystals at a temperature of about 1000° C. to 1150° C. is less absorbed.

As a result, when the zircon crystals increase exceeding a certain level, a residual volume expansion of the refractory itself increases extremely to generate cracks due to deterioration of the strength of the refractory structure and sometimes finally result in pulverization.

Accordingly, a high zirconia electrically fused cast refractory that less forms zircon crystals and is stable against heat cycles has been demanded (first subject).

Further, even a high zirconia electrically fused cast refractory which less causes zircon crystals by heating or heat cycles to the refractory itself sometimes tends to form zircon crystals when the refractory is in contact with the molten glass.

Particularly, when the high zirconia electrically fused cast refractory is used for a melting furnace for non-alkali glass such as liquid crystal display (LCD) panel glass (which may be hereinafter referred to as liquid crystal glass), zircon crystals are often tended to be formed.

The zircon crystals are formed upon melting of the glass due to difference of the concentration of the constituent components between the molten glass and the glass phase of the high zirconia electrically fused cast refractory by substitution of the components with each other.

That is, components that suppress the formation of the zircon crystals in the high zirconia electrically fused cast refractory are diffused into the molten glass, or components tending to form the zircon crystals intrude from the molten glass into the refractory. It is considered that the formation of the zircon crystals in the high zirconia electrically fused cast refractory is promoted by the occurrence of one or both of the diffusion and the intrusion described above.

In a state where the zircon crystals are formed in the high zirconia electrically fused cast refractory used for the glass melting furnace and the amount of the glass phase is decreased, abrupt volumic change of the zirconia crystals at a temperature of about 1000° C. to 1150° C. becomes difficult to be absorbed.

As a result, when the refractory undergoes heat cycles due to heating during operation and change of operation temperature, the residual volume expansion of the refractory itself increases extremely, by which the strength of the refractory structure is lowered tending to cause cracks in the refractory. The refractory is eroded selectively from the cracked portion. When erosion proceeds further, pieces of the refractory intrude into the molten glass to sometimes deteriorate the quality of the glass.

On the other hand, when a high zirconia electrically fused cast refractory that less forms the zircon crystals even in contact with the molten glass is used as the furnace material, the zircon crystals are less formed and the refractory remains stable even undergoing heat cycles due to heating during operation or change of the operation temperature of the glass melting furnace and cracks are less formed. Further, in the course of temperature lowering when the production of the glass melting furnace is interrupted, further occurrence of cracks and growing of already formed cracks can be suppressed.

Accordingly, upon restarting of operation after interruption of the operation, the high zirconia electrically fused cast refractory can be used again without replacing the refractory.

As described above, it has been demanded for a high zirconia electrically fused cast refractory that less forms the zircon crystals even under the condition in contact with the molten glass (second subject).

Further, the high zirconia electrically fused cast refractory tends to form unsaturated oxides with the oxygen content being less than a theoretical value and forms a strongly reducing composition. Accordingly, oxides of metals such as Fe, Cu, and Cr contained as impurities in the starting material are tended to be reduced and present as metals. Accordingly, the high zirconia electrically fused cast refractory has a lower degree of oxidation and exhibits dark gray color. Then, under the condition in which the refractory is in contact with the molten glass, bubbles due to the reduced metals are tended to be formed (the state tending to generate bubbles is hereinafter referred to as bubble foamability is insufficient).

Particularly, in high quality glass such as liquid crystal glass, failure of products due to bubbles provided a subject in view of the quality. Accordingly, less bubble formable refractory under the condition in contact with the molten glass has been demanded (third subject).

The high zirconia electrically fused cast refractory less foaming zircon crystals and having low bubble formability has been investigated so far.

Japanese Unexamined Patent Publication (JP-A) No. H08 (1995)-48573 proposes a high zirconia electrically fused cast refractory of high electric resistance and stable against heat cycles, comprising 85 to 96% by weight of $ZrO_2$, 3 to 8% by weight of $SiO_2$, 0.1 to 2% by weight of $Al_2O_3$, 0.05 to 3% by weight of $B_2O_3$, 0.05% by weight or more of $Na_2O$, 0.05 to 0.6% by weight of $Na_2O$ and $K_2O$ and 0.05 to 3% by weight of BaO, SrO and MgO.

However, the refractory of JP-A No. H08(1995)-48573 contains much $B_2O_3$ and has insufficient bubble foamability. Further, the refractory does not contain CaO that controls the viscosity of the glass phase and stabilizes the glass phase and contains much MgO that remarkably promotes the formation of zircon crystals in the refractory itself and under the condition in contact with the molten glass.

Accordingly, while the refractory contains $Na_2O$, $K_2O$, BaO, and SrO that suppress formation of the zircon crystals in heating the refractory itself, since it contains MgO of remarkably promoting formation of the zircon crystals, suppression for the formation of the zircon crystals was insufficient. Further, under the condition in contact with the molten glass, $Na_2O$ and $K_2O$ tend to migrate into the molten glass and suppression for the formation of the zircon crystals was insufficient.

JP-A No. H09(1997)-2870 proposes a high zirconia electrically fused cast refractory with less cracks during production and due to heat cycles, comprising 89 to 96% by weight of $ZrO_2$, 2.5 to 8.5% by weight of $SiO_2$, 0.2 to 1.5% by weight of $Al_2O_3$, less than 0.5% by weight of $P_2O_5$, less than 1.2% by weight of $B_2O_3$, less than 0.3% by weight of CuO, more than 0.01 and less than 1.7% by weight of $P_2O_5+B_2O_3$, 0.05 to 1.0% by weight of $Na_2O+K_2O$, 0.01 to 0.5% by weight of BaO, less than 0.5% by weight of $SnO_2$, and less than 0.3% by weight of $Fe_2O_3+TiO_2$.

JP-A No. H09(1997)-2870 describes in the paragraph 0028 of the specification that "symbol "–" for the content represents the content of less than 0.01% by weight and this means no substantial content".

That is, in JP-A No. H09(1997)-2870, the minimum unit of the content is 0.01% by weight.

Further, it is described in the paragraph 0019 that "the content of $P_2O_5$ and $B_2O_3$ in total is more than 0.01% by weight and less than 1.7% by weight. When the content of $P_2O_5$ and $B_2O_3$ is extremely small, such an effect cannot be provided".

That is, in a case where the contents of $P_2O_5$ and $B_2O_3$ is extremely small, each of the contents is less than 0.01% by weight and the total contents is also less than 0.01% by weight.

On the other hand, in a case where the content of $P_2O_5$ and $B_2O_3$ in total is more than 0.01% by weight, $P_2O_5$ and $B_2O_3$ are contained each by 0.01% by weight or more and the total content of them is 0.02% by weight or more.

Accordingly, in JP-A No. H09(1997)-2870, the content of $P_2O_5$ is 0.01% by weight or more.

In JP-A No. H09(1997)-2870, addition of $Na_2O$, $K_2O$ and BaO provides an effect of suppressing cracks during production and, even if $P_2O_5$ and $B_2O_3$ that promote the formation of the zircon crystals by heating are contained more or less, cracks are not generated and the formation of the zircon crystals can be suppressed after the heat cycle test for the refractory.

However, while the refractory contains BaO that suppresses the formation of the zircon crystal, since it contains $P_2O_5$ that remarkably promotes the formation of the zircon crystals, suppression for the formation of the zircon crystals was insufficient in the heating of the refractory itself. Further, under the condition in contact with the molten glass, $Na_2O$ and $K_2O$ that suppress the formation of the zircon crystals tend to migrate to the molten glass and suppression of the formation of the zircon crystals was insufficient.

Further, when $P_2O_5$ is reduced, it tends to form iron-phosphorus compounds together with iron as the impurity in the refractory, which remarkably deteriorate the bubble foamability of the refractory when it is in contact with the molten glass.

Further, $SnO_2$ is not an essential component and the effect of $SnO_2$ against cracks during production and cracks after heat cycles is not described at all and the addition effect of $SnO_2$ is unknown.

JP-A No. 2000-302560 proposes a less bubble foaming high zirconia electrically fused cast refractory of suppressing the formation of the zircon crystals comprising 86 to 96% by weight of $ZrO_2$, 3 to 10% by weight of $SiO_2$, 0.5 to 2% by weight of $Al_2O_3$, 0.05 to 3% by weight of $Na_2O$, 0.05 to 0.3% by weight of $B_2O_3$ and 0.2% by weight or less of $Fe_2O_3$, CuO and $Cr_2O_3$ in total, and not containing $P_2O_5$.

In JP-A No. 2000-302560, bubble foamability is improved by restricting the content of $Fe_2O_3$, CuO, and $Cr_2O_3$ that cause bubble forming under the condition in contact with the molten glass.

However, since the $B_2O_3$ content was large, bubble foamability was insufficient. Further, under the condition in contact with the molten glass, $Na_2O$ tends to migrate to the molten glass and the suppression for the formation of the zircon crystals was insufficient.

JP-A No. 2007-176736 proposes a low bubble formability high zirconia electrically fused cast refractory of suppressing the formation of the zircon crystals comprising 87 to 94% by weight of $ZrO_2$, 3.0 to 8.0% by weight of $SiO_2$, 1.2 to 3.0% by weight of the $Al_2O_3$, more than 0.35% to 1.0% by weight of $Na_2O$, more than 0.02% by weight and less than 0.05% by weight of $B_2O_3$, not substantially comprising $P_2O_5$ and CuO and in which the weight ratio of $Al_2O_3$ and $Na_2O$ is 2.5 to 5.0 thereby suppressing the formation of zircon crystals in the refractory itself.

In JP-A No. 2007-176736, the refractory is less bubble formable and can suppress the formation of the zircon crystals in the refractory itself. However, under the condition in contact with the molten glass, $Na_2O$ tends to migrate into the molten glass and it was insufficient to suppress the formation of the zircon crystals.

JP-A No. 2008-7358 proposes a high zirconia electrically fused cast refractory of high electric resistance excellent in heat cycle stability and comprising 87 to 96% by weight of the $ZrO_2$, 0.1 to less than 0.8% by weight of $Al_2O_3$, 3 to 10% by weight of $SiO_2$, less than 0.05% by weight of $Na_2O$, 0.01 to 0.2% by weight of $K_2O$, 0.1 to 1.0% by weight of $B_2O_3$, 0.1 to 0.5% by weight of BaO, less than 0.05% by weight of SrO, 0.01 to 0.15% by weight of CaO, 0.05 to 0.4% by weight of $Y_2O_3$, 0.1% by weight or less of MgO, 0.3% by weight or less of $Fe_2O_3+TiO_2$, and less than 0.01% by weight of $P_2O_5$ and CuO.

In JP-A No. 2008-7358, since the content of $Na_2O$ is small and the content of $B_2O_3$ is large, bubble foamability was insufficient. Further, although BaO and SrO as components for suppressing the formation of the zircon crystals are contained, $Na_2O$ tends to migrate to the molten glass under the condition in contact with the molten glass and the effect of suppressing the formation of the zircon crystals was insufficient.

WO 2012/046785A1 discloses a high zirconia electrically fused cast refractory less foaming zircon crystals, comprising 86 to 96% by weight of $ZrO_2$, 2.5 to 8.5% by weight of $SiO_2$, 0.4 to 3% by weight of $Al_2O_3$, 0.4 to 1.8% by weight of $K_2O$, 0.04% by weight or less of $B_2O_3$, 0.04% by weight or less of $P_2O_5$, and 3.8% by weight or less of $Cs_2O$ and not substantially comprising $Na_2O$ (0.04% by weight or less). However, since the contents of $B_2O_3$ and $P_2O_5$ for preventing cracks during production are extremely small and alkali metal oxides such as $K_2O$ and $Cs_2O$ of large ionic radius are contained by large amount, it was insufficient for stably producing large-sized products with less cracks during production and in the course of temperature rising. Further, since the $Na_2O$ content is small, bubble foamability was insufficient.

Further, $Cs_2O$ is extremely expensive to result in a problem in view of industrial productivity.

WO 2012/046786A1 proposes a high zirconia electrically fused cast refractory less precipitating zircon crystals, comprising 85 to 95% by weight of $ZrO_2$, 2.5% by weight or more of $SiO_2$, 0.04% by weight or less of $Na_2O$, 0.04% by weight or less of $B_2O_3$, 0.04% by weight or less of $P_2O_5$, and SrO as an essential component, containing at least one of $K_2O$ and $Cs_2O$, and satisfying the following equation (1) and equation (2):

$$0.2 \leq 0.638 \times C(K_2O) + 0.213 \times C(Cs_2O) + 0.580 \times C(SrO)/C(SiO_2) \leq 0.40 \quad \text{Formula (1)}$$

$$0.10 \leq 0.580 \times C(SrO)/C(SiO_2) \quad \text{Formula (2)}$$

in which C(X) represents the content (mass %) of the component X.

A high zirconia electrically fused cast refractory with no cracks during production and less forming zircon crystals even in contact with the molten glass by defining the molar concentration ratio of $K_2O$, $Cs_2O$, and SrO to $SiO_2$ according to the formulae (1) and (2) was proposed.

However, since the contents of $B_2O_3$ and $P_2O_5$ that prevent cracks during production is very small and alkali metal oxides such as $K_2O$ and $Cs_2O$ having a large ionic radius are contained each in a large amount, it was insufficient for stably producing large-sized products with less cracks during production and in the course of temperature rising. Further, since the $N_2O$ content is small, the bubble foamability was insufficient.

Further, $Cs_2O$ is extremely expensive and results in a problem in view of industrial productivity.

As described above, high zirconia electrically fused cast refractory free of cracks during production of the refractory and in the course of temperature rising that can simultaneously provide effects of suppressing the formation of the zircon crystals even under a condition in contact with the molten glass, and low bubble formability cannot be obtained yet in prior art.

SUMMARY OF THE INVENTION

The present invention intends to provide a high zirconia electrically fused cast refractory having long time durability, causing less cracks during production of the refractory and in the course of temperature rising, excellent in bubble foamability to molten glass, less forming zircon crystals and less forming cracks in the refractory itself and even undergoing heat cycles in the refractory itself and during operation of a glass melting furnace and under the condition in contact with molten glass.

1) For solving the subject, the present invention provides, in a first aspect, a high zirconia electrically fused cast refractory comprising, as chemical components, 85 to 95% by weight of $ZrO_2$,
0.4 to 2.5% by weight of $Al_2O_3$,
3.5 to 10.0% by weight of $SiO_2$,
0.05% by weight or more of $Na_2O$,
0.05 to 0.7% by weight of $Na_2O$ and $K_2O$ in total,
0.01 to 0.04% by weight of $B_2O_3$,
0.1 to 3.0% by weight of SrO or BaO when one of BaO and SrO is contained, or 0.1% by weight or more of SrO and 0.1 to 3.0% by weight of SrO and BaO in total when both of BaO and SrO are contained,
0.01 to 0.2% by weight of CaO,
0.1% by weight or less of MgO,
0.01 to 0.7% by weight of $SnO_2$,
0.3% by weight or less of $Fe_2O_3$ and $TiO_2$ in total,
less than 0.01% by weight of $P_2O_5$, and
less than 0.01% by weight of CuO.

2) The present invention also provides, in a second aspect, a high zirconia electrically fused cast refractory comprising, as chemical components:

89 to 95% by weight of $ZrO_2$,
0.4 to 2.0% by weight of $Al_2O_3$,
3.5 to 6.0% by weight of $SiO_2$,
0.05% by weight or more of $Na_2O$,
0.1 to 0.6% by weight of $Na_2O$ and $K_2O$ in total,
0.01 to 0.04% by weight of $B_2O_3$,
0.1 to 2.5% by weight of SrO or more than 0.5% to 2.5% by weight of BaO when one of BaO and SrO is contained, 0.1% by weight or more of SrO and 0.1 to 2.5% by weight of SrO and BaO in total when both of BaO and SrO are contained,
0.01 to 0.15% by weight of CaO,
0.1% by weight or less of MgO,
0.04 to 0.5% by weight of $SnO_2$,
0.3% by weight or less of $Fe_2O_3$ and $TiO_2$ in total,
less than 0.01% by weight of $P_2O_5$, and
less than 0.01% by weight of CuO.

The present invention further provides preferred embodiments of the high zirconia electrically fused cast refractory according to the first or second feature of the invention as set forth below.

3) The high zirconia electrically fused cast refractory in (1) or (2), wherein the number of bubbles in the liquid crystal glass after heating at 1600° C. for 4 hours is 70 N/cm² or less.

4) The high zirconia electrically fused cast refractory in any one of (1) to (3), wherein the number of bubbles in the liquid crystal glass after heating at 1350° C. for 4 hours is 150 N/cm² or less.

5) The high zirconia electrically fused cast refractory in any one of (1) to (4), wherein the residual volume expansion after heating repetitively for 20 cycles is 3% or less, with a process of holding at 600° C. for one hour, then rising the temperature to 1450° C. and holding at 1450° C. for one hour being as one cycle.

6) The high zirconia electrically fused cast refractory in any one of (1) to (5), wherein the residual volume expansion is 5% or less after heating repetitively for 10 cycles, with a process of filling liquid crystal glass in a crucible made of high zirconia electrically fused cast refractory, with a process holding at 800° C. for 3 hours, and then rising temperature up to 1450° C. and holding at 1450° C. for 3 hours being as one cycle.

7) The high zirconia electrically fused cast refractory in any one of (1) to (6), wherein the thickness of zircon formed at the bottom of a refractory crucible is 3 mm or less, after heating repetitively for 10 cycles, with a process of filling liquid crystal glass in a crucible made of high zirconia fused cast refractory, holding at 800° C. for 3 hours, and then rising the temperature up to 1450° C. and holding at 1450° C. for 3 hours being as one cycle.

8) The high zirconia electrically fused cast refractory in any one of (1) to (7), wherein the cracks are not generated in one side heating test of heating the high zirconia electrically fused cast refractory up to 1000° C. at a heating rate of 100° C./hour.

9) The high zirconia electrically fused cast refractory in any one of (1) to (8), wherein high zirconia electrically fused cast refractory is used for a glass melting furnace.

The present invention can provide a high zirconia electrically fused cast refractory capable of simultaneously providing properties of not generating cracks during production of the refractory and in the course of temperature rising, excellent in the bubble foamability to the molten glass, and less forming zircon crystals in refractory itself or under the condition in contact with the molten glass.

When the high zirconia electrically fused cast refractory of the invention is used as the furnace material for glass melting furnace, since defective bubbles are less formed in the glass to be produced and the zircon crystals are less formed in the refractory, generation and growing of cracks less occur in the refractory during operation. Accordingly, long time operation is possible also including restarting of operation without exchanging the refractory, which is extremely advantageous industrially.

Accordingly, when the high zirconia electrically fused cast refractory of the invention is used for the glass melting furnace, since the quality of glass products is not deteriorated and cracks or pulverization less occurs in the refractory even after interrupting the operation of the glass melting furnace, the refractory can be re-used without replacement.

BRIEF DESCRIPTION OF THE DRAWINGS

Examples of the present invention will be described in detail based on the following FIGURE, wherein, FIG. is a graph illustrating an amount of zircon by high temperature X-ray diffractiometry of Reference Examples.

DETAILED DESCRIPTION OF THE PREFERRED EMBODIMENTS

As a result of an earnest study made by the present inventors, a high zirconia electrically fused cast refractory having excellent properties of the invention can be obtained. This is, a high zirconia electrically fused cast refractory comprising, as chemical components, 85 to 95% by weight of $ZrO_2$, 0.4 to 2.5% by weight of $Al_2O_3$, 3.5 to 10.0% by weight of $SiO_2$, 0.05% by weight or more of $Na_2O$, 0.05 to 0.7% by weight of $Na_2O$ and $K_2O$ in total, 0.01 to 0.04% by weight of $B_2O_3$, 0.1 to 3.0% by weight of SrO or BaO when one of BaO and SrO is contained, or 0.1% by weight or more of SrO and 0.1 to 3.0% by weight of SrO and BaO in total when both of BaO and SrO are contained, 0.01 to 0.2% by weight of CaO, 0.1% by weight or less of MgO, 0.01 to 0.7% by weight of $SnO_2$, 0.3% by weight or less of $Fe_2O_3$ and $TiO_2$ in total, less than 0.01% by weight of $P_2O_5$, and less than 0.01% by weight of CuO.

The refractory is free of cracks during production excellent in productivity, excellent in bubble foamability to the molten glass as the furnace material for glass melting furnace, less forms zircon crystals in the refractory itself or even under the condition in contact with the molten glass, and can suppress the generation of cracks during operation of the glass melting furnace.

Accordingly, a high zirconia electrically fused cast refractory having long time durability also capable of being re-used can be obtained.

More preferably, the invention provides a high zirconia electrically fused cast refractory comprising, as chemical components: 89 to 95% by weight of $ZrO_2$, 0.4 to 2.0% by weight of $Al_2O_3$, 3.5 to 6.0% by weight of $SiO_2$, 0.05% by weight or more of $Na_2O$, 0.1 to 0.6% by weight of $Na_2O$ and $K_2O$ in total, 0.01 to 0.04% by weight of $B_2O_3$, 0.1 to 2.5% by weight of SrO or more than 0.5% to 2.5% by weight of BaO when one of BaO and SrO is contained, 0.1% by weight or more of SrO and 0.1 to 2.5% by weight of SrO and BaO in total when both of BaO and SrO are contained, 0.01 to 0.15% by weight of CaO, 0.1% by weight or less of MgO, 0.04 to 0.5% by weight of $SnO_2$, 0.3% by weight or less of $Fe_2O_3$ and $TiO_2$ in total, less than 0.01% by weight of $P_2O_5$ and less than 0.01% by weight of CuO.

Referring to the expression of weight percentage, for example, "0.1 to 0.5% by weight" means "0.1% by weight or more and 0.5% by weight or less".

The present inventors have specifically studied the evaluation method for the high zirconia electrically fused cast refractory to be used for glass melting furnaces, and the composition of the refractory.

As a method of evaluating the formation of the zircon crystals, it was adopted so far a method of measuring a residual volume expansion after a heat cycle test of heating a sample of the refractory repetitively in a range from 800° C. to 1250° C. and judging the state of forming the zircon crystals depending on the value. Since there is a positive correlation between the residual volume expansion and the amount of the formed zircon crystals, a refractory having a small residual volume expansion after the heat cycle test and forming less zircon crystals was required.

However, as apparent from the result of a high temperature X-ray diffractiometry illustrated in FIG., it has been demonstrated that the zircon starts formation from about 1200° C., increases continuously even when heating up to 1450° C. and that the amount of formed zircon crystals varies depending on the kind and the addition amount of additives.

Then, for evaluating the effect of the additives more exactly, the temperature condition of the heat cycle test has been reconsidered to extend the temperature range so as to set the temperature in a lower region to 600° C. which is a temperature lower than the glass transition point (about 800° C.) of the glass phase of the refractory and set the temperature in a higher region to 1450° C. which is a temperature lower than the dissociation temperature of the zircon crystals (about 1550° C.) where the zircon crystals are under growing, respectively, so that the effect of suppressing the formation of the zircon crystals can be evaluated more exactly even by lesser number of heating cycles.

Particularly, since the residual volume expansion is considerably larger according to the new measuring method also for a refractory of low residual volume expansion which was considered to have an effect of suppressing the formation of zircon crystals by the existent method, the effect of suppressing the formation of the zircon crystals can be evaluated more exactly.

Further, in the evaluation under the condition in contact with the molten glass, migration of the components in the glass phase of the refractory and the components in the molten glass are promoted by performing heat cycles under the heat treatment conditions closer to the conditions described above in a state where the refractory is in contact with the molten glass and that of the zircon crystals formed in the refractory can be evaluated at conditions closer to those in the actual furnace. Further, the cracks observed in actual furnaces can also be evaluated.

Since the temperature of the melts of high zirconia electrically fused cast refractory is generally at an extremely high temperature (2400° C. or higher), heat resistant graphite is used as a mold material. The graphite mold comprises carbon which is a material of high density, high strength, and low gas permeability.

As described above, the high zirconia electrically fused cast refractory has a composition tending to form unsaturated oxides in which the oxygen concentration of the refractory is lower than a theoretical value. Further since the refractory is in contact with the graphite mold from casting to cooling solidification of the molten material, the surface portion of the refractory is reduced strongly.

Accordingly, oxides of Fe, Cu, Cr, etc. contained as impurities in the starting material tend to be reduced to metals. Further, also $P_2O_5$ tends to be reduced to form Fe—P compounds.

Accordingly, the high zirconia electrically fused cast refractory tends to be reduced under the effect of the properties of the molten material and the graphite mold, exhibits dark gray color, and bubbles derived from the refractory tend to be generated in the molten glass under the condition in contact with the molten glass. The reducing effect is stronger at a portion closer to the cast surface of the refractory and the number of bubbles increases.

Conventionally, bubble foamability was evaluated by taking plate-like samples from a position inside from the casting surface of the refractory by 25 mm or more. As will be described later, the bubble foamability of the refractory is evaluated for a portion 10 mm inside from the casting surface of the refractory where the number of bubbles is larger by remarkably undergoing the effect of the cast mold. Further, in the existent evaluation method for the plate-like sample, the sample tends to be oxidized by the effect of the surrounding oxidizing atmosphere. In the present invention, the shape of the sample is changed from the plate-like shape in the prior art to a crucible-shape. Since the glass is heated in a state surrounded by the refractory, glass less undergoes the effect of the surrounding atmosphere and is less oxidized compared with the existent method. Accordingly, in the evaluation method of the invention, the number of bubbles increases considerably than that in the existent method.

Further, since the sample is evaluated also at 1350° C., which is lower than the operation temperature of the glass melting furnace, the generated bubbles less leave from the glass and evaluation is applied under an extremely severer condition than that of the existent method.

As a result of adopting the evaluation method described above and evaluating the composition of the refractory in details, the present invention has been accomplished by incorporating $Na_2O$ as an essential component, incorporating one or more of $Na_2O$ and $K_2O$, one or more of SrO and BaO, further incorporating CaO and $SnO_2$, and restricting the contents of $B_2O_3$ and $P_2O_5$ for suppressing the formation of the zircon crystals to form less bubble formable refractory both in the refractory itself and under the condition in contact with the molten glass.

Particularly, $SnO_2$ remarkably has an effect of preventing cracks during production even at a low $B_2O_3$ content, an effect of suppressing the formation of the zircon crystals in the refractory, and an effect of suppressing the formation of the zircon crystals under the condition in contact with the molten glass, and it has been found that $SnO_2$ has an effect of restricting the migration of Na ions and K ions that tend to diffuse into the molten glass, particularly, an effect of restricting the migration of Na ions of small ionic radius, an effect of restricting the migration of Ba ions and Sr ions and, further, an effect of improving the bubble foamability for the molten glass.

As a result, the refractory having the composition within the range of the invention is free of cracks during production of the refractory and in the course of temperature rising, remarkably suppresses formation and growing of the zircon crystals both in the refractory itself and under the condition in contact with the molten glass, less causes generation of cracks and growing of the cracks during operation, and enables long time operation including restarting of the operation. Further, the refractory has excellent bubble foamability to the molten glass and high quality glass products can be obtained.

The $ZrO_2$ content is preferably 85 to 95% by weight and, more preferably, 89 to 95% by weight. If $ZrO_2$ is less than 85% by weight, corrosion resistance to the glass is deteriorated.

If $ZrO_2$ is more than 95% by weight, since the amount of the glass phase is decreased relatively, cracks tend to be generated due to the temperature change during production of the refractory, in the course of temperature rising, during operation and in the course of temperature lowering of the glass melting furnace.

$SiO_2$ is a main component of the glass phase. The $SiO_2$ content is 3.5 to 10.0% by weight and, preferably, 3.5 to 6.0% by weight. If the $SiO_2$ content is less than 3.5% by weight, this increases the $ZrO_2$ content relatively and cracks tend to be generated during production of the refractory and due to temperature change of the melting furnace. If $SiO_2$ is more than 10.0% by weight, this lowers the $ZrO_2$ content to deteriorate the corrosion resistance.

$Al_2O_3$ is a component of lowering the melting temperature of the glass phase and, concurrently, has an effect of suppressing the formation of the zircon crystals. The $Al_2O_3$ content is 0.4 to 2.5% by weight and, more preferably, 0.4 to 2.0% by weight. If $Al_2O_3$ is less than 0.4% by weight, the effect of suppressing the formation of the zircon crystals is insufficient. If $Al_2O_3$ is more than 2.5% by weight, corundum or mullite crystals tend to be precipitated in the glass phase to increase a residual volume expansion after the heat cycle.

$B_2O_3$, like $SiO_2$, is a component of forming a borosilicate glass in the glass phase of the refractory. Further, while $B_2O_3$ is an important component having an effect of preventing cracks during production of the refractory and cracks in the course of temperature rising, the oxidation degree of the refractory is lowered and the number of bubbles is remarkably increased along with increase of the $B_2O_3$ content.

Generally, if $B_2O_3$ is less than 0.1% by weight, the effect of preventing cracks during production cannot be obtained. However, the present invention can prevent cracks during production of the refractory and prevent cracks in the course of temperature rising and obtain low bubble foamability by restricting the $Na_2O$ and $K_2O$ contents, incorporating one or more of BaO and SrO, and causing CaO and $SnO_2$ to be present together, even at an extremely small $B_2O_3$ content of 0.01 to 0.04% by weight.

On the other hand, if the $B_2O_3$ content is more than 0.04% by weight, the number of bubbles in the molten glass is remarkably increased, which is not preferred. Accordingly, the $B_2O_3$ content is preferably 0.01 to 0.04% by weight and, more preferably, 0.01 to 0.03% by weight and, further preferably, 0.01 to 0.02% by weight.

$Na_2O$ and $K_2O$ have an effect of remarkably suppressing the formation of the zircon crystals in the glass phase of the refractory. Further, $Na_2O$ has an effect of remarkably improving the bubble foamability, and is an important component for solving the first to third subjects 1, 2, and 3 described above.

Generally, when the refractory contains less $B_2O_3$ having an effect of preventing cracks during production and in the course of temperature rising, contains much $Na_2O$ and $K_2O$ having a large heat expansion coefficient and remarkably lowering the viscosity of the glass phase, large cracks accompanied with oozing of glass tend to be generated at corners and wide planes of products during production of large-sized products such as sidewall blocks of the glass furnace. Further, cracks tend to be generated additionally in the course of temperature rising of the refractory. Accordingly, it was necessary to remove cracks by grinding the refractory for a considerable thickness, which resulted in a problem in view of the productivity.

However, in the present invention, cracks during production and in the course of temperature rising can be prevented even in a refractory of low $B_2O_3$ content and high $Na_2O$ and $K_2O$ content by restricting the contents of $Na_2O$ and $K_2O$, incorporating one or more of BaO and SrO, and causing CaO and $SnO_2$ to be present together.

Further, under the condition in which the refractory is in contact with the molten glass, Na ions and K ions contained in the glass phase of the refractory tend to migrate to the molten glass and zircon crystals tend to be formed in the glass phase of the refractory. However, when $SnO_2$ is incorporated within the range of the present invention, migration of Na ions and K ions, particularly, Na ions, and migration of Ba ions and Sr ions can be restricted to maintain the effect of suppressing the formation of the zircon crystals.

Further, $Na_2O$ is an essential component since it tends to cause the refractory to a higher oxidation state than $K_2O$ and has a remarkable effect of improving the bubble foamability of the glass. Accordingly, it is preferred in the present invention that $Na_2O$ is used as the essential component and one or more of $N_2O$ and $K_2O$ are contained.

If the total amount of $Na_2O$ and $K_2O$ is less than 0.05% by weight, the effect of suppressing the formation of the zircon crystals and the bubble foamability of the refractory are insufficient and, on the other hand, if the total amount exceeds 0.7% by weight, cracks tend to be generated during production of the refractory and in the course of temperature rising.

$Na_2O$ is contained by 0.05% by weight or more and the total amount of $Na_2O$ and $K_2O$ is 0.05 to 0.7% by weight. Preferably, $Na_2O$ is contained by 0.05% by weight or more and the total amount of $Na_2O$ and $K_2O$ is 0.1 to 0.6% by weight. More preferably, the total amount of $Na_2O$ and $K_2O$ is 0.2 to 0.5% by weight.

BaO and SrO lower the viscosity of the molten material during melting of the blended material, form a stable glass phase in the refractory, and suppress the formation of the zircon crystals. Further, within the range of the invention containing $SnO_2$, BaO and SrO have an effect of remarkably suppressing the formation of the zircon crystals in the glass phase of the refractory in the refractory itself and, further, under the condition in contact with the molten glass by the synergistic effect of $SnO_2$ and BaO and SrO, and they are important components for solving the first and second subjects.

Further, since both of BaO and SrO are present in the glass phase not solid-solubilized to $ZrO_2$ crystals and have relatively large ionic radius, they less migrate in the molten glass even in contact with the molten glass.

However, in the melting of liquid crystal glass as a main application use of the refractory of the invention, the liquid crystal glass often contains relatively less BaO and much SrO. Accordingly, under the condition where the molten glass and the refractory are in contact, Ba ions tend to diffuse from the glass phase of the refractory to the molten glass, while Sr ions less diffuse from the glass phase of the refractory to the molten glass.

Accordingly, for suppressing the formation of the zircon crystals under the condition in contact with the molten glass, BaO is preferably contained by more than an amount capable of suppressing the formation of the zircon crystals in the refractory itself.

The content of one or more of BaO and SrO is preferably 0.1 to 3.0% by weight.

If the content is less than 0.1% by weight, the effect of suppressing the formation of the zircon crystals is insufficient. If the content of one or more of BaO and SrO is more than 3.0% by weight, since the $ZrO_2$ content is lowered relatively, corrosion resistance of the refractory is deteriorated and silicate compounds of barium or strontium are formed, the glass phase becomes instable.

If they are contained each alone, the content of SrO or BaO is preferably 0.1 to 3.0% by weight. The content of SrO or BaO is more preferably 0.3 to 3.0% by weight.

The BaO content is more preferably more than 0.5% to 3.0% by weight.

Further preferably, the SrO content is 0.1 to 2.5% by weight. Particularly preferably, the SrO content is 0.3 to 2.5% by weight. Particularly preferably, the BaO content is more than 0.5% to 2.5% by weight.

When both of them are contained, it is preferred that SrO is 0.1% by weight or more and the amount of SrO and BaO in total is 0.1 to 3.0% by weight. It is more preferably that SrO is 0.1% by weight or more and the amount of SrO and BaO in total is 0.3 to 3.0% by weight.

More preferably, SrO is 0.1% by weight or more and the amount of SrO and BaO in total is 0.1 to 2.5% by weight.

Particularly preferably, SrO is 0.3% by weight or more and the amount of SrO and BaO in total is 0.3 to 2.5% by weight.

Since CaO, like BaO and SrO, lowers the viscosity of the molten material during melting the blended material and prevents cracking in a one side heating test by forming a stable glass phase in the refractory, CaO is an essential component in the invention. While CaO also has an effect of suppressing the formation of the zircon crystals within a predetermined range, the CaO content is preferably 0.2% by weight or less in the invention since the residual volume expansion of the refractory increases after the heat cycle test if CaO is more than 0.2% by weight.

Further, since CaO is present as an impurity in the starting $ZrO_2$ material, starting materials should be selected carefully.

Accordingly, the CaO content is preferably 0.01 to 0.2% by weight and, more preferably, 0.01 to 0.15% by weight.

MgO, like BaO, SrO, and CaO, lowers the viscosity of the molten material during melting the blended materials and forms a stable glass phase. However, even in a relatively small amount of about 0.1% by weight or more, MgO tends to promote the formation of the zircon crystals in the refractory itself and under the condition in contact with the molten glass.

Then, when the zircon crystals are formed and the glass phase of the refractory is decreased, MgO tends to be solid-solubilized in the $ZrO_2$ crystals. Further, when MgO is solid-solubilized in the $ZrO_2$ crystals, the rate of heat expansion is different between a solid-solubilized portion and a not solid-solubilized portion in the $ZrO_2$ crystals. Accordingly, when the refractory undergoes heat cycles in the solid-solubilized state, the residual volume expansion of the refractory after the heat cycles may increase extremely to sometimes cause pulverization.

Since MgO is also present as the impurity in the starting $ZrO_2$ material, the starting material should be selected carefully. The MgO content is preferably 0.1% by weight or less, more preferably, 0.05% by weight or less and, further preferably, 0.01% by weight or less.

$SnO_2$ lowers the viscosity of the glass phase of the refractory and forms a stable glass phase. In the invention with less $B_2O_3$ content, $SnO_2$ has an effect of preventing cracks during production of the high zirconia electrically fused cast refractory and in the course of temperature rising, an effect of transferring the temperature of forming the zircon crystals to a higher temperature region and suppressing the formation of the zircon crystals, an effect of suppressing the migration of Na ions and K ions, particularly, Na ions, an effect of suppressing the migration of Ba ions and Sr ions under the condition in contact with the molten glass, and further, an effect of improving the bubble foamability. Since $SnO_2$ has such extremely useful properties, this is an important component of the invention for solving the first to third subjects.

Further, when one or more of BaO and SrO is present together with $SnO_2$, formation and growing of the zircon crystals can be suppressed remarkably by the synergistic effect with such oxides.

While the reason of the useful effects of $SnO_2$ described above is not apparent, it may be supposed that the effects may be attributable, for example, to a possibility that $SnO_2$ is present as a glass forming oxide like $SiO_2$ and $B_2O_3$, easy releasing and intaking of oxygen due to Sn valence change between bivalence and tetravalence under a certain temperature condition, and electroconductivity of $SnO_2$.

However, if the $SnO_2$ content is excessive, the refractory is colored and the number of bubbles in the molten glass increases.

Accordingly, the $SnO_2$ content is preferably 0.01 to 0.7% by weight, more preferably, 0.04 to 0.5% by weight and, further preferably, 0.1 to 0.3% by weight.

$P_2O_5$, like $B_2O_3$, has an effect of preventing cracks during production and in the course of temperature rising.

However, $P_2O_5$, even by a small amount, remarkably promotes the formation and the growing of the zircon crystals in the high zirconia electrically fused cast refractory. $P_2O_5$, when reduced, tends to form iron-phosphorus compounds with iron as an impurity in the refractory and remarkably deteriorates the bubble foamability of the refractory. Further, $P_2O_5$ is highly hygroscopic and has a nature that a dense refractory is hardly produced when $P_2O_5$ is used in the starting material.

$P_2O_5$ is also an impurity contained in the starting $ZrO_2$ material and the content is preferably less than 0.01% by weight.

$Fe_2O_3$ and $TiO_2$ are impurities contained in the starting $ZrO_2$ material. Since such oxides cause coloration and bubble foaming of the molten glass, their content should be restricted in the invention.

The amount of $Fe_2O_3$ and $TiO_2$ in total is preferably 0.3% by weight or less, more preferably, 0.25% by weight or less and, further preferably, 0.2% by weight or less.

CuO is present as an impurity in the starting zirconia material and colors the molten glass and increases the number of bubbles in the glass even in a small amount. Accordingly, the CuO content is preferably less than 0.01% by weight.

$Y_2O_3$ is present as an impurity in the starting zirconia material and, since this is a component of promoting the formation of the zircon crystals and increasing the residual volume expansion of the refractory after the heat cycle, the starting material should be selected carefully.

If the $Y_2O_3$ content exceeds 0.3% by weight, the residual volume expansion after the heat cycle for the refractory is increased to worsen the heat cycle stability. Accordingly, the $Y_2O_3$ content is preferably 0.3% by weight or less and, more preferably, 0.2% by weight or less.

As other additive, ZnO is effective in the effect of suppressing the formation of the zircon crystals. However, incorporation of ZnO is not preferred since a dense refractory is difficult to be obtained, and the corrosion resistance of the refractory is deteriorated.

EXAMPLE

A high zirconia electrically fused cast refractory according to a preferred example of the invention is to be described.

A zirconia material, which was obtained by desiliconizing zircon sand, was blended with other raw materials including oxide materials such as $SiO_2$, $Al_2O_3$, $Na_2O$, $B_2O_3$, BaO, SrO, and $SnO_2$, and nitrate salt materials, etc. in predetermined ratios on the basis of oxide. After mixing them, they were melted in an electric arc furnace, cast in a mold, and buried together with the mold in an alumina powder, and gradually cooled to a room temperature.

The mold used in the example was made of graphite and had a product portion sized 100×300×300 mm and a feeder portion having an inner size of 140×235×350 mm and connected integrally over the product portion.

After gradual cooling, the cast product was taken out of the alumina powder and the product portion was separated from the feeder portion to obtain a desired high zirconia electrically fused cast product.

For demonstrating the effect of BaO, SrO, and $SnO_2$ to the formation of zircon crystals, Table 1 and FIG. show the result of high temperature X-ray diffractiometry on refractories having compositions out of the range of the invention with less $Na_2O$ and $K_2O$ content (Reference Examples 1 to 5). Each of the amounts of the components in Table 1 is based on the weight %.

The trend of forming the zircon crystals was evaluated by the high temperature X-ray diffraction.

At first, a powder of a high zirconia electrically fused cast refractory pulverized to a size of several microns was set to an alumina holder of an X-ray diffraction apparatus (XRD-6000: manufactured by Shimadzu Corporation) provided with a sample heating attachment (HA-1001: manufactured by Shimadzu Corporation). Then, after heating the temperature to 1450° C. at a heating rate of 20° C./min, the temperature was cooled to 600° C. at 20° C./min. X-ray diffractiometry was performed in the course of temperature rising, while keeping the powder for one minute for every 50° C. from 1000° C. and a diffraction peak intensity of zircon was measured. In the same manner, X-ray diffraction was performed in the course of the temperature cooling from 1400° C. to 600° C. while keeping the powder for one minute on every 100° C. In order to evaluate the state of forming the zircon crystals, an integrated value for the highest peak of the zircon crystals was calculated as a peak area and the value was defined as an evaluation value for the amount of formed zircon.

Reference Example 1 is for a composition not containing BaO, SrO and $SnO_2$. Zircon crystals started to be formed at 1250° C. and the amount of formed crystals increased along with rising of the temperature and increased continuously also in the course of temperature lowering after rising the temperature to 1450° C. The integration intensity of zircon at 1400° C. in the course of temperature lowering was 154.

Reference Example 2 is an example with addition of BaO. The temperature for forming the zircon crystals increased to 1300° C. and the amount of formed zircon was also decreased compared with Reference Example 1. The integration intensity of zircon at 1400° C. in the course of temperature lowering was 125.

Reference Example 3 is an example with addition of BaO and $SnO_2$. The temperature for forming the zircon crystals increased to 1350° C. The integration intensity of zircon at 1400° C. in the course of temperature lowering was 95, which was decreased to about 60% of Reference Example 1.

Reference Example 4 is an example in which the amount of BaO and $SnO_2$ was increased. The temperature for forming the zircon crystals increased to 1400° C. The integration intensity of zircon at 1400° C. in the course of temperature lowering was 43, which was decreased to about 30% of Reference Example 1.

Reference Example 5 is an example with addition of SrO and $SnO_2$. The temperature for forming the zircon crystals lowered to 1150° C., and the amount of zircon formed showed a maximum value at 1350° C.

The effect of suppressing the formation of the zircon crystals was sufficient and the integration intensity of zircon at 1400° C. in the course of temperature lowering was 35, which was decreased to about 25% of Reference Example 1.

As described above, formation of the zircon crystals was suppressed remarkably by the addition of BaO, SrO, and $SnO_2$.

Table 2 shows the composition and the property of the high zirconia electrically fused cast refractories of Example 1 to Example 14.

Further, Table 3 shows the composition and the property of the high zirconia electrically fused cast refractories of Comparative Example 1 to Comparative Example 14.

The amount for each of the components in Tables 1, 2, and 3 is based on weight %. Each of the components was analyzed by flame photometry for $K_2O$ and $Na_2O$, absorption analysis for $P_2O_5$, and ICP for other components. However, the analysis methods are not restricted in the present invention and other analysis methods are also applicable. In the analysis of the invention, 10 spherical samples each of 30 mm diameter were taken from casting of the molten material and analysis values obtained by pulverizing the samples were defined as analysis values for the high zirconia electrically fused refractory.

For the cracks during production, the state of products after digging up was observed and the presence or absence of cracks was evaluated in a state where the product was not yet subjected to surface finishing. Refractory with no cracks was judged as "none", refractory with cracks up to 2 mm width and 50 mm length was judged as "minute", and refractory with larger cracks was judged as "cracked".

The heat cycle test 1 is an existent evaluation method.

A specimen sized 50×50×100 mm was cut out from a bottom portion sized 300×300 mm (bottom portion: opposite to the surface from which the feeder portion was separated) and the cast surface was cut each by 25 mm to obtain an evaluation specimen sized 50×50×50 mm.

The specimen was heated to 800° C. at a temperature heating rate of 3° C./rain and kept for one hour. Then, the specimen was heated up to 1250° C. at a temperature heating rate of 3° C./rain and kept at 1250° C. for one hour. After keeping for one hour, the specimen was cooled down to 800° C. at a temperature cooling rate of 3° C./rain and kept for one hour. Heat cycles were repeated for 20 cycles, assuming a process of keeping at 800° C. for one hour and keeping at 1250° C. for one hour being as one cycle.

Based on the sizes before and after heating in the heat cycle test, a residual volume expansion after the test was calculated and cracks and the state of pulverization of the refractory after the heat cycle test were confirmed. Then, the specimen was judged as "none" when there were no cracks, as "minute" for the cracks of 0.2 mm or less of width, as "cracked" for the width of 0.3 mm or more, and as "pulverized" when the specimen was pulverized.

The residual volume expansion in the heat cycle test 1 is preferably 2% or less and, more preferably, 1% or less.

A heat cycle test 2 is a new measuring method.

In view of the result of high temperature X-ray diffractiometry, a heat cycle test was performed within a range of a temperature from 600° C. which is the glass transition point or lower of the glass phase in the refractory in a low temperature region to a temperature of 1450° C. where the zircon crystals continue to be formed in a high temperature region.

For the specimen in the heat cycle test 2, a specimen of an identical size was obtained from the side opposite to that in the heat cycle test 1. The specimen was heated to 600° C. at a temperature heating rate of 3° C./ruin and kept for one hour. Then, the specimen was heated up to 1450° C. at a temperature heating rate of 3° C./min and kept at 1450° C. for one hour. After keeping the specimen for one hour, the specimen was cooled down to 600° C. at a temperature cooling rate of 3° C./min and kept for one hour. Heat cycles were repeated for 20 cycles assuming a process of keeping at 600° C. for one hour and keeping at 1450° C. for one hour being as one cycle. After repeating 20 heat cycles, the sizes before and after the heating were measured to calculate the residual volume expansion and cracks and the pulverized state of the refractory after the heat cycle test were confirmed.

Since the residual volume expansion in the heat cycle test 2 showed a considerably larger value than that of the result of the heat cycle test 1 as the existent method, the trend of forming the zircon crystals can be judged easily in a shorter time.

The residual volume expansion in the heat cycle test 2 is preferably 3% or less and, more preferably, 1% or less.

A heat cycle test 3 is a new test method that evaluates the reactivity under the condition where the refractory is in contact with molten glass.

A square specimen sized 100×100×100 mm was cut out from a corner portion on the bottom of a product sized 100×300×300 mm, a central portion at the surface opposite to the bottom was drilled to a depth of 70 mm by a drill bit of 50 mm diameter, a drilled core was cut out to prepare a crucible of the high zirconia electrically fused cast refractory. Further, for eliminating the effect of the metal component caused by the drilling, the crucible was washed with an acid and further with ion exchanged water and then dried.

The refractory crucible was filled with about 230 g of liquid crystal glass pulverized to about 1 to 3 mm. The crucible was heated to 800° C. at a temperature heating rate of 3° C./min and kept for three hours. Then, the crucible was heated up to 1450° C. at the same heating rate and kept for 3 hours. Subsequently, the crucible was cooled to 800° C. at a temperature cooling rate of 3° C./min. Then, the crucible was heated repetitively for 10 cycles, assuming a process of heating at 800° C. for three hours and keeping at 1450° C. for three hours being as one cycle. After the heating, the residual volume expansion of the refractory crucible was measured based on the sizes before and after the heating.

Further, cracks and the pulverization state of the refractory crucible after the heat cycle test 3 were confirmed. The residual volume expansion after the heat cycle test 3 was preferably 5% or less, more preferably, 3% or less and, particularly preferably, 1% or less.

Further, a drilled core of 19 mm diameter was cut out from the bottom of the refractory crucible to obtain a specimen of 19 mm diameter×30 mm length. A central part for 19 mm diameter was half-cut and the half-cut surface was observed under a microscope to measure the thickness of zircon formed at the bottom of the refractory crucible in contact with the molten glass.

The thickness of zircon formed at the boundary with the refractory after the heat cycle test 3 is preferably 3 mm or less, more preferably, 2 mm or less and, particularly preferably, 1 mm or less.

The bubble foamability was evaluated by the following method. A drilled core of 50 mm diameter was cut out from a cast surface at a central portion of 300×300 mm surface of the refractory sized 100×300×300 mm, and cut at a position of 30 mm from the cast surface. Further, the central portion of the cast surface of the drilled core was cut out by drilling 30 mm diameter and 10 mm depth to prepare a refractory crucible having an outer size of 50 mm diameter and 30 mm height and an inner size of 30 mm diameter and 10 mm depth. For eliminating the effect of a working jig, the refractory crucible was washed with an acid and further with ion exchanged water and dried. After drying, the refractory crucible was calcined at 1350° C. for 2 hours. After cooling, the crucible was filled with about 13 g of liquid crystal glass cullets each of 1 to 3 mm size, temperature was heated up to 1350° C. at a temperature heating rate of 4° C./min and the heating was applied at 1350° C. for 4 hours. Then, the crucible was cooled to a room temperature at a temperature cooling rate of 4° C./minute. Further, after calcining another crucible prepared in the same manner at 1600° C. for 2 hours, the crucible was filled with glass cullets and heated at 1600° C. for 4 hours. After completing the heating, the number of bubbles generated in the liquid crystal glass was observed by a stereomicroscope. In the observation of the bubbles, the number of bubbles in the glass was measured by a microscope under optional 4 view fields and the number of the bubbles per unit area was determined based on the average value and the area of the measurement view field.

The number of bubbles after heating at 1600° C. for 4 hours is preferably 70 N/cm$^2$ or less and, more preferably, 50 N/cm$^2$ or less.

The number of bubbles after heating at 1350° C. for 4 hours is preferably 150 N/cm$^2$ or less and, more preferably, 100 N/cm$^2$ or less.

The liquid crystal glass used in the test was non-alkali glass comprising 60% by weight of $SiO_2$, 15% by weight of $Al_2O_3$, 7% by weight of CaO, 7% by weight of SrO, 7% by weight of $B_2O_3$, 1% by weight of MgO, and 3% by weight of BaO.

In a one-side heating test, a specimen sized 100×300×300 mm was set in an electric furnace such that one of 300×300 mm surfaces was in contact with the inside of the furnace and the opposite surface thereof was in contact with the outside of the furnace. The specimen was heated up to 1000° C. at a temperature heating rate of 100° C./hr and the absence or presence for the occurrence of cracks in the course of the temperature rising was measured.

Then, Examples 1 to 14 are to be described.

Examples 1 to 14 in Table 2 are within the range of the invention.

There were no cracks during production of the refractory and in the course of temperature rising, and the residual volume expansion was also small, and no large cracks were generated after the heat cycle tests 1 and 2. Further, the residual volume expansion was small also in the heat cycle test 3, and the thickness of the zircon crystals formed to the refractory was extremely small even under the condition in contact with the molten glass, and the formation of the zircon crystals was suppressed. Further, the liquid crystal glass had less number of bubbles and excellent bubble foamability.

Then, Comparative Examples 1 to 14 are to be described.

Comparative Examples 1 to 14 in Table 3 are out of the range of the invention.

Comparative Example 1 is an example of not containing BaO, SrO, $SnO_2$, and $K_2O$ but containing much $B_2O_3$. In the heat cycle test 1, cracks were generated. In the heat cycle tests 2 and 3, the residual volume expansion was large and the specimen was pulverized. After the heat cycle test 3, the thickness of the formed zircon was large. By the bubble formability test, the number of bubbles was large.

Comparative Example 2 is an example corresponding to JP-A No. 2000-302560 not containing BaO, SrO, $SnO_2$, or $K_2O$ but containing much $B_2O_3$ in which $Fe_2O_3$+$TiO_2$ content and $Cr_2O_3$ content ($Cr_2O_3$ content: 0.01% by weight although not shown in Table) were restricted. Fine cracks were generated upon digging out. In the heat cycle test 3, fine cracks were generated and the thickness of zircon formed in the refractory was large. Further, by the bubble formability test, the number of bubbles was large.

Comparative Example 3 is an example corresponding to WO2012/046785A1 not containing BaO, SrO, Na$_2$O, or SnO$_2$ but containing K$_2$O, Cs$_2$O, and P$_2$O$_5$. Large cracks in which glass phase component was oozed were generated during production. In the heat cycle test 3, fine cracks were generated and cracks were generated also in the one-side heating test. Further, by the bubble formability test, the number of bubbles was large.

Comparative Example 4 is an example having a large amount of BaO and SrO in total. Cracks were generated in the heat cycle test 2. The pulverization was caused and the thickness of formed zircon was large in the heat cycle test 3.

Comparative Example 5 is an example containing much SiO$_2$ and CaO and less ZrO$_2$. Cracks were generated in the heat cycle tests 2 and 3. The thickness of formed zircon was large in the heat cycle test 3. Further, by the bubble formability test, the number of bubbles was large.

Comparative Example 6 is an example containing less SiO$_2$ and Al$_2$O$_3$ and much ZrO$_2$ and P$_2$O$_5$. Fine cracks were generated upon digging up. Cracks were generated in the heat cycle test 1, the refractory was pulverized in the heat cycle tests 2 and 3. The thickness of zircon formed was large in the heat cycle tests 3. Further, by the bubble formability test, the number of bubbles was large. Also, Cracks were generated in the one-side heating test.

Comparative Example 7 is an example containing much Al$_2$O$_3$, B$_2$O$_3$, and MgO. Cracks were generated in the heat cycle test 1, the refractory was pulverized and the residual volume expansion was also large in the heat cycle tests 2 and 3. The thickness of the zircon formed was large in the heat cycle test 3.

Further, by the bubble formability test, the number of bubbles was large.

Comparative Example 8 is an example corresponding to WO2012/046786A1 containing much K$_2$O, containing Cs$_2$O and SrO, and not containing SnO$_2$. Cracks were generated upon digging up. Fine cracks were generated in the heat cycle test 3 and cracks were also generated in the one-side heat heating test. Further, by the bubble formability test, the number of bubbles was large.

Comparative Example 9 is an example corresponding to JP-A No. 2007-176736 containing much Na$_2$O, not containing BaO, SrO, or SnO$_2$, and containing relatively less B$_2$O$_3$.

Fine cracks were generated and the thickness of formed zircon was large in the heat cycle test 3. Further, cracks were generated in the one-side heat test.

Comparative Example 10 is an example corresponding to JP-A No. H08-48573 containing BaO, SrO, and MgO. Cracks were generated in the heat cycle test 1 and the refractory was pulverized in the heat cycle tests 2 and 3. Further, by the bubble formability test, the number of bubbles was large.

Comparative Example 11 is an example corresponding to JP-A No. H09-2870 containing P$_2$O$_5$, B$_3$O$_3$, SnO$_2$, and BaO. Cracks were generated in the heat cycle tests 1 and 2, and the refractory was pulverized in the heat cycle test 3. Further, by the bubble formability test, the number of bubbles was large.

Comparative Example 12 is an example of containing much SnO$_2$, Fe$_2$O$_3$+TiO$_2$, and Y$_2$O$_3$.

The product after digging up was slightly thin, deformed in the direction of the thickness and the inside of the refractory was blackened.

Cracks were generated in the heat cycle tests 1 and 2. The refractory was pulverized in the heat cycle test 3.

Further, by the bubble formability test, the number of bubbles was large.

Comparative Example 13 is an example corresponding to JP-A No. 2008-7358 containing much B$_2$O$_3$ and not containing Na$_2$O or SnO$_2$.

Cracks were generated in the heat cycle tests 2 and 3 and the thickness of zircon formed was large in the heat cycle test 3. Further, by the bubble formability test, number of bubbles was large.

Comparative Example 14 is an example containing BaO and SnO$_2$ but not containing B$_2$O$_3$. Cracks were generated upon digging up. Fine cracks were generated in the heat cycle test 3. Cracks were generated in the one-side heating test.

TABLE 1

|  |  | Reference Example | | | | |
|---|---|---|---|---|---|---|
|  |  | 1 | 2 | 3 | 4 | 5 |
| Component (% by-weight) | ZrO2 | 93.1 | 92.3 | 92.1 | 91.9 | 91.9 |
|  | SiO2 | 4.9 | 5.3 | 5.2 | 5.2 | 5.2 |
|  | Al2O3 | 0.56 | 0.56 | 0.62 | 0.81 | 0.81 |
|  | Na2O | <0.01 | <0.01 | <0.01 | <0.01 | <0.01 |
|  | K2O | 0.03 | 0.03 | 0.03 | 0.03 | 0.03 |
|  | B2O3 | 0.47 | 0.47 | 0.46 | 0.47 | 0.47 |
|  | BaO | <0.01 | 0.45 | 0.53 | 0.83 | <0.01 |
|  | SrO | <0.01 | <0.01 | <0.01 | <0.01 | 0.65 |
|  | CaO | 0.06 | 0.07 | 0.08 | 0.06 | 0.08 |
|  | MgO | <0.01 | <0.01 | <0.01 | <0.01 | <0.01 |
|  | SnO2 | <0.01 | <0.01 | 0.09 | 0.12 | 0.09 |
|  | Fe2O3 + TiO2 | 0.25 | 0.25 | 0.25 | 0.25 | 0.25 |
|  | CuO | <0.01 | <0.01 | <0.01 | <0.01 | <0.01 |
|  | P2O5 | <0.01 | <0.01 | <0.01 | <0.01 | <0.01 |
|  | Y2O3 | 0.18 | 0.18 | 0.16 | 0.19 | 0.19 |
| Zircon formation starting temperature (° C.) | | 1250 | 1300 | 1350 | 1400 | 1150 |
| Zircon integrated Intensity at 1400° C. | | 154 | 125 | 95 | 43 | 35 |

|  |  | Example | | | | | | | | |
|---|---|---|---|---|---|---|---|---|---|---|
|  |  | 1 | 2 | 3 | 4 | 5 | 6 | 7 | 8 | 9 |
| Component (% by weight) | ZrO2 | 91.4 | 91.9 | 91.6 | 87.5 | 91.8 | 90.5 | 89.4 | 91.0 | 91.2 |
|  | SiO2 | 4.61 | 4.75 | 4.86 | 9.50 | 4.55 | 5.87 | 4.60 | 4.01 | 4.70 |
|  | Al2O3 | 1.80 | 1.17 | 1.20 | 0.75 | 2.30 | 1.17 | 1.50 | 1.75 | 0.42 |
|  | Na2O | 0.30 | 0.43 | 0.29 | 0.45 | 0.55 | 0.35 | 0.25 | 0.05 | 0.12 |
|  | K2O | 0.10 | <0.01 | 0.12 | 0.02 | <0.01 | <0.01 | 0.20 | 0.03 | 0.43 |
|  | B2O3 | 0.03 | 0.04 | 0.01 | 0.04 | 0.01 | 0.04 | 0.03 | 0.03 | 0.03 |
|  | BaO | 0.85 | 0.94 | 0.86 | 0.53 | 0.05 | 0.52 | 0.51 | 2.50 | 1.50 |
|  | SrO | <0.01 | <0.01 | 0.38 | <0.01 | 0.11 | 0.60 | 2.20 | <0.01 | 0.55 |
|  | CaO | 0.05 | 0.04 | 0.02 | 0.03 | 0.06 | 0.03 | 0.14 | 0.03 | 0.18 |
|  | MgO | <0.01 | 0.01 | <0.01 | 0.10 | 0.01 | 0.04 | 0.01 | <0.01 | 0.03 |
|  | SnO2 | 0.25 | 0.23 | 0.20 | 0.45 | 0.06 | 0.37 | 0.65 | 0.02 | 0.08 |

-continued

|  |  |  |  |  |  |  |  |  |  |  |
|---|---|---|---|---|---|---|---|---|---|---|
|  | Fe2O3 + TiO2 | 0.18 | 0.15 | 0.17 | 0.30 | 0.16 | 0.19 | 0.21 | 0.24 | 0.17 |
|  | CuO | <0.01 | <0.01 | <0.01 | <0.01 | <0.01 | <0.01 | <0.01 | <0.01 | <0.01 |
|  | P2O5 | <0.01 | <0.01 | <0.01 | <0.01 | <0.01 | <0.01 | <0.01 | <0.01 | <0.01 |
|  | Y2O3 | 0.19 | 0.19 | 0.13 | 0.12 | 0.16 | 0.20 | 0.16 | 0.22 | 0.29 |
|  | Cs2O | <0.01 | <0.01 | <0.01 | <0.01 | <0.01 | <0.01 | <0.01 | <0.01 | <0.01 |
| Cracks in production |  | none | none | none | none | none | none | none, colored | none | none |
| Heat cycle test 1 | Cracks and pulverization | none | none | none | none | none | none | none | none | none |
|  | Residual volume expansion (%) | 0 | 0.1 | 0.2 | 0.1 | 0.1 | 0.9 | 0.5 | 1.1 | 1.5 |
| Heat cycle test 2 | Cracks and pulverization | none | none | none | none | none | none | none | none | none |
|  | Residual volume expansion (%) | 0.1 | 0.2 | 0.3 | 0.3 | 0.3 | 1.1 | 0.4 | 2.3 | 2.5 |
| Heat cycle test 3 | Cracks and pulverization | none | none | none | none | none | none | none | none | minute |
|  | Residual volume expansion (%) | 0.1 | 0.5 | 0.3 | 0.5 | 0.5 | 0.3 | 0.3 | 1.5 | 4.8 |
|  | Thickness of zircon formed (mm) | 0.03 | 0.1 | 0.2 | 0.5 | 0.1 | 1.5 | 0.2 | 1.4 | 2.5 |
| Blubble form- ability | 1350° C.- 4 h (N/cm2) | 28 | 35 | 36 | 120 | 76 | 67 | 85 | 130 | 65 |
|  | 1600° C.- 4 h (N/cm2) | 10 | 9 | 12 | 57 | 35 | 20 | 45 | 65 | 29 |
| One-side heating test | Cracks | none | none | none | none | none | none | none | none | none |

|  |  |  | Example |  |  |  |  |
|---|---|---|---|---|---|---|---|
|  |  |  | 10 | 11 | 12 | 13 | 14 |
| Com- ponent (% by weight) | ZrO2 |  | 94.3 | 91.0 | 89.2 | 92.1 | 92.7 |
|  | SiO2 |  | 3.55 | 4.78 | 7.85 | 5.10 | 4.65 |
|  | Al2O3 |  | 1.19 | 1.91 | 1.50 | 1.12 | 0.93 |
|  | Na2O |  | 0.05 | 0.45 | 0.29 | 0.55 | 0.62 |
|  | K2O |  | 0.10 | 0.21 | 0.12 | 0.05 | 0.03 |
|  | B2O3 |  | 0.01 | 0.03 | 0.02 | 0.02 | 0.03 |
|  | BaO |  | 0.35 | <0.01 | <0.01 | 0.17 | <0.01 |
|  | SrO |  | <0.01 | 0.89 | 0.35 | <0.01 | 0.18 |
|  | CaO |  | 0.03 | 0.04 | 0.02 | 0.05 | 0.08 |
|  | MgO |  | <0.01 | 0.01 | 0.01 | 0.01 | 0.01 |
|  | SnO2 |  | 0.15 | 0.21 | 0.22 | 0.25 | 0.27 |
|  | Fe2O3 + TiO2 |  | 0.17 | 0.17 | 0.17 | 0.25 | 0.27 |
|  | CuO |  | <0.01 | <0.01 | <0.01 | <0.01 | <0.01 |
|  | P2O5 |  | <0.01 | <0.01 | <0.01 | <0.01 | <0.01 |
|  | Y2O3 |  | 0.13 | 0.17 | 0.13 | 0.17 | 0.15 |
|  | Cs2O |  | <0.01 | <0.01 | <0.01 | <0.01 | <0.01 |
| Cracks in production |  |  | none | none | none | none | none |
| Heat cycle test 1 | Cracks and pulverization |  | none | none | none | none | none |
|  | Residual volume expansion (%) |  | 0.8 | 0.2 | 0.1 | 0.7 | 0.8 |
| Heat cycle test 2 | Cracks and pulverization |  | none | none | none | none | none |
|  | Residual volume expansion (%) |  | 1.2 | 0.3 | 0.4 | 1.5 | 0.8 |
| Heat cycle test 3 | Cracks and pulverization |  | none | none | none | none | none |
|  | Residual volume expansion (%) |  | 2.5 | 0.1 | 1.2 | 2.5 | 2.0 |

-continued

|  |  | | | | | |
|---|---|---|---|---|---|---|
| | Thickness of zircon formed (mm) | 2.2 | 0.1 | 0.1 | 2.1 | 2.5 |
| Blubble formability | 1350° C.-4 h (N/cm2) | 67 | 30 | 63 | 83 | 71 |
| | 1600° C.-4 h (N/cm2) | 30 | 5 | 27 | 45 | 37 |
| One-side heating test | Cracks | none | none | none | none | none |

| | | Comparative Example | | | | | | | |
|---|---|---|---|---|---|---|---|---|---|
| | | 1 | 2 | 3 | 4 | 5 | 6 | 7 | 8 |
| Component (% by weight) | ZrO2 | 93.6 | 92.0 | 92.5 | 90.0 | 84.5 | 95.4 | 90.7 | 90.1 |
| | SiO2 | 4.50 | 4.70 | 4.40 | 4.51 | 11.50 | 2.90 | 4.40 | 4.65 |
| | Al2O3 | 0.60 | 1.80 | 1.50 | 1.00 | 1.60 | 0.20 | 2.80 | 1.50 |
| | Na2O | 0.15 | 0.50 | <0.01 | 0.20 | 0.20 | 0.45 | 0.10 | <0.01 |
| | K2O | <0.01 | <0.01 | 0.45 | <0.01 | 0.10 | <0.01 | 0.02 | 1.30 |
| | B2O3 | 0.25 | 0.10 | 0.01 | 0.04 | 0.03 | 0.04 | 0.45 | 0.01 |
| | BaO | <0.01 | <0.01 | <0.01 | 2.50 | 0.70 | 0.25 | 0.51 | <0.01 |
| | SrO | <0.01 | <0.01 | <0.01 | 0.90 | 0.30 | <0.01 | 0.10 | 1.20 |
| | CaO | 0.05 | 0.15 | 0.06 | 0.15 | 0.25 | 0.10 | 0.06 | 0.10 |
| | MgO | 0.01 | 0.06 | 0.02 | 0.10 | 0.01 | 0.01 | 0.15 | 0.01 |
| | SnO2 | <0.01 | <0.01 | <0.01 | 0.04 | 0.15 | 0.05 | 0.10 | <0.01 |
| | Fe2O3 + TiO2 | 0.25 | 0.15 | 0.25 | 0.25 | 0.25 | 0.20 | 0.19 | 0.25 |
| | CuO | <0.01 | <0.01 | <0.01 | <0.01 | <0.01 | <0.01 | <0.01 | <0.01 |
| | P2O5 | <0.01 | <0.01 | 0.02 | <0.01 | <0.01 | 0.08 | <0.01 | <0.01 |
| | Y2O3 | 0.18 | 0.18 | 0.18 | 0.18 | 0.25 | 0.18 | 0.16 | 0.16 |
| | Cs2O | <0.01 | <0.01 | 0.30 | <0.01 | <0.01 | <0.01 | <0.01 | 0.40 |
| Cracks in production | | none | minute | cracked | none | none | minute | none | cracked |
| Heat cycle test 1 | Cracks and pulverization | cracked | none | none | none | none | cracked | cracked | none |
| | Residual volume expansion (%) | 12.0 | 1.0 | 2.0 | 7.0 | 7.0 | 10.5 | 12.4 | 0.3 |
| Heat cycle test 2 | Cracks and pulverization | pulverized | none | none | cracked | cracked | pulverized | pulverized | none |
| | Residual volume expansion (%) | 30.0 | 2.0 | 3.0 | 12.1 | 18.5 | 32.5 | 35.0 | 1.0 |
| Heat cycle test 3 | Cracks and pulverization | pulverized | minute | minute | pulverized | cracked | pulverized | pulverized | minute |
| | Residual volume expansion (%) | 20.0 | 2.0 | 5.0 | 20.5 | 15.0 | 45.3 | 29.5 | 1.0 |
| | Thickness of zircon formed (mm) | 20.0 | 3.2 | 0.2 | 12.5 | 4.1 | 18.5 | 23.6 | 0.4 |
| Blubble formability | 1350° C.-4 h (N/cm2) | 245 | 170 | 210 | 95 | 188 | 320 | 300 | 185 |
| | 1600° C.-4 h (N/cm2) | 126 | 75 | 101 | 42 | 84 | 165 | 120 | 85 |
| One-side heating test | Cracks | none | none | cracked | none | none | cracked | none | cracked |

| | | Comparative Example | | | | | |
|---|---|---|---|---|---|---|---|
| | | 9 | 10 | 11 | 12 | 13 | 14 |
| Component (% by weight) | ZrO2 | 91.9 | 91.5 | 91.9 | 91.1 | 92.5 | 91.9 |
| | SiO2 | 4.54 | 3.70 | 4.50 | 4.00 | 5.20 | 4.69 |
| | Al2O3 | 2.05 | 0.61 | 1.20 | 1.50 | 0.60 | 1.80 |
| | Na2O | 0.78 | 0.11 | 0.25 | 0.05 | <0.01 | 0.65 |
| | K2O | <0.01 | 0.02 | 0.05 | 0.25 | 0.05 | <0.01 |
| | B2O3 | 0.03 | 1.10 | 0.21 | 0.03 | 0.52 | <0.01 |
| | BaO | <0.01 | 1.51 | 0.35 | 0.51 | 0.25 | 0.15 |
| | SrO | <0.01 | 0.31 | <0.01 | 0.53 | 0.02 | <0.01 |
| | CaO | 0.08 | <0.01 | 0.06 | 0.06 | 0.12 | 0.12 |
| | MgO | 0.01 | 0.40 | 0.01 | 0.01 | 0.01 | 0.08 |
| | SnO2 | <0.01 | <0.01 | 0.10 | 0.79 | <0.01 | 0.03 |
| | Fe2O3 + TiO2 | 0.25 | 0.28 | 0.25 | 0.38 | 0.25 | 0.25 |
| | CuO | <0.01 | <0.01 | 0.05 | <0.01 | <0.01 | <0.01 |
| | P2O5 | <0.01 | <0.01 | 0.30 | <0.01 | <0.01 | <0.01 |
| | Y2O3 | 0.18 | 0.20 | 0.25 | 0.37 | 0.20 | 0.18 |
| | Cs2O | <0.01 | <0.01 | <0.01 | <0.01 | <0.01 | <0.01 |
| Cracks in production | | none | none | none | deformed colored | none | cracked |

|  |  |  |  |  |  |  |  |
|---|---|---|---|---|---|---|---|
| Heat cycle test 1 | Cracks and pulverization | none | cracked | cracked | cracked | none | none |
|  | Residual volume expansion (%) | 0.4 | 10.2 | 15.0 | 9.5 | 7.0 | 0.8 |
| Heat cycle test 2 | Cracks and pulverization | none | pulverized | cracked | cracked | cracked | none |
|  | Residual volume expansion (%) | 2.0 | 65.0 | 25.0 | 18.5 | 18.0 | 2.5 |
| Heat cycle test 3 | Cracks and pulverization | minute | pulverized | pulverized | pulverized | cracked | minute |
|  | Residual volume expansion (%) | 2.5 | 30.0 | 25.0 | 47.5 | 15.0 | 2.5 |
|  | Thickness of zircon formed (mm) | 3.9 | 20.0 | 3.8 | 0.6 | 15.0 | 2.8 |
| Blubble formability | 1350° C.-4 h (N/cm2) | 85 | 345 | >500 | 470 | 285 | 140 |
|  | 1600° C.-4 h (N/cm2) | 45 | 163 | 293 | 231 | 165 | 63 |
| One-side heating test | Cracks | cracked | none | none | none | none | cracked |

The invention claimed is:

1. A high zirconia electrically fused cast refractory comprising, as chemical components,
   85 to 95% by weight of $ZrO_2$,
   0.4 to 2.5% by weight of $Al_2O_3$,
   3.5 to 10.0% by weight of $SiO_2$,
   0.05% by weight or more of $Na_2O$, and 0.05 to 0.7% by weight of $Na_2O$ and $K_2O$ in total,
   0.01 to 0.04% by weight of $B_2O_3$,
   0.1 to 3.0% by weight of SrO or BaO when one of BaO and SrO is contained, 0.1% by weight or more of SrO and 0.1 to 3.0% by weight of SrO and BaO in total when both of BaO and SrO are contained,
   0.01 to 0.2% by weight of CaO,
   0.1% by weight or less of MgO,
   0.01 to 0.7% by weight of $SnO_2$,
   0.3% by weight or less of $Fe_2O_3$ and $TiO_2$ in total,
   less than 0.01% by weight of $P_2O_5$, and
   less than 0.01% by weight of CuO.

2. The high zirconia electrically fused cast refractory comprising according to claim 1, as chemical components:
   89 to 95% by weight of $ZrO_2$,
   0.4 to 2.0% by weight of $Al_2O_3$,
   3.5 to 6.0% by weight of $SiO_2$,
   0.05% by weight or more of $Na_2O$ and 0.1 to 0.6% by weight of $Na_2O$ and $K_2O$ in total,
   0.1 to 2.5% by weight of SrO or more than 0.5% to 2.5% by weight of BaO when BaO or SrO is contained alone, 0.1% by weight or more of SrO and 0.1 to 2.5% by weight of SrO and BaO in total when both of BaO and SrO are contained,
   0.01 to 0.15% by weight of CaO,
   0.04 to 0.5% by weight of $SnO_2$.

3. The high zirconia electrically fused cast refractory according to claim 1, wherein a number of bubbles in a liquid crystal glass after heating at 1600° C. for 4 hours is 70 N/cm² or less.

4. The high zirconia electrically fused cast refractory according to claim 1, wherein a number of bubbles in the liquid crystal glass after heating at 1350° C. for 4 hours is 150 N/cm² or less.

5. The high zirconia electrically fused cast refractory in claim 1, wherein a residual volume expansion after heating repetitively for 20 cycles is 3% or less, with a process of holding at 600° C. for one hour, then rising the temperature to 1450° C. and holding at 1450° C. for one hour being as one cycle.

6. The high zirconia electrically fused cast refractory in claim 1, wherein a residual volume expansion is 5% or less after heating repetitively for 10 cycles, with a process of filling liquid crystal glass in a crucible made of high zirconia electrically fused cast refractory, with a process holding at 800° C. for 3 hours, and then rising temperature up to 1450° C. and holding at 1450° C. for 3 hours being as one cycle.

7. The high zirconia electrically fused cast refractory in claim 1, wherein a thickness of zircon formed at a bottom of a refractory crucible is 3 mm or less, after heating repetitively for 10 cycles, with a process of filling liquid crystal glass in a crucible made of high zirconia electrically fused cast refractory, holding at 800° C. for 3 hours, and then rising the temperature up to 1450° C. and holding at 1450° C. for 3 hours being as one cycle.

8. The high zirconia electrically fused cast refractory in claim 1, wherein cracks are not generated in one side heating test of heating the high zirconia electrically fused cast refractory up to 1000° C. at a heating rate of 100° C./hour.

9. The high zirconia electrically fused cast refractory in claim 1, wherein high zirconia electrically fused cast refractory is used for a glass melting furnace.

* * * * *